Figure 1:
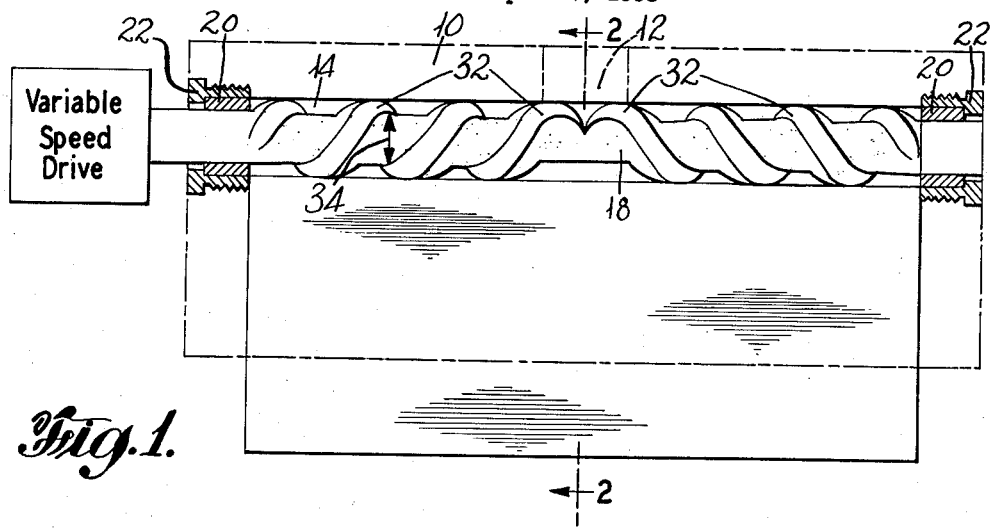

Nov. 13, 1962 A. P. LIMBACH 3,063,095
APPARATUS FOR DISTRIBUTING PLASTIC MATERIAL
Filed Sept. 17, 1958

INVENTOR
ANTHONY P. LIMBACH
BY
*James C. Arrantes*
ATTORNEY

United States Patent Office 3,063,095
    Patented Nov. 13, 1962

3,063,095
    APPARATUS FOR DISTRIBUTING PLASTIC MATERIAL
    Anthony P. Limbach, New Brunswick, N.J., assignor to Union Carbide Corporation, a corporation of New York
    Filed Sept. 17, 1958, Ser. No. 761,556
    3 Claims. (Cl. 18—12)

This invention relates to apparatus for distributing a mass of plastic material. More particularly, this invention relate to apparatus for distributing a mass of plastic material to the die orifice of a flat-film forming die whereby the film produced is characterized by a uniform thickness.

A problem of long standing in the plastics industry has been the difficulty of producing uncontaminated, flat-film or sheet material of uniform thickness from the same die orifice. Generally, in the production of flat-film or sheet material, a plastic such as polyethylene or polyvinyl chloride, is fed into a long profile, flat-film forming die and extruded from the die orifice. In most flat-film forming apparatus, the forming die has a distributor channel running parallel and across the entire width of the die orifice. Plastic material is fed under pressure into the distributor channel, is distributed along the distributor channel under pressure, then passes from the distributor channel into the die orifice and is extruded therefrom in the form of a flat-film or sheet.

It has been found, however, that as the plastic material is fed into the distributor channel of the flat-film forming die and forced along the distributor channel away from the feed-in point, the pressure which is exerted on the plastic material progressively decreases. Pressure which is exerted on the plastic material in forcing the plastic material into the distributor channel is not uniformly transmitted throughout the entire length of the distributor channel. The pressure, therefore, acting on the plastic material at points along the distributor channel is not uniform. In effect, the pressure which is initially exerted on the plastic material forcing it into the distributor channel is dissipated in forcing the plastic material along the distributor channel. The pressure exerted on the plastic material is greater at points nearer to the feed-in point of the distributor channel and decreases in proportion to the distance from the feed-in point. Consequently, the plastic material passes from the distributor channel and into the die orifice of the extrustion apparatus under pressures which vary from point to point across the entire width of the die orifice.

The pressure "drop" results in the plastic material being forced into and through the die orifice under different pressures along points on any given cross-sectional area defined by a plane taken on a line transverse to the direction of flow of the plastic material into the die orifice. This pressure differential causes the production of flat-film or sheet material of different thickness from the same die orifice.

In addition to the pressure drop which normally occurs in the distributor channel and leads to the production of flat-film material of non-uniform thickness, another difficulty of major importance in the production of flat-film is the stagnation problem. Plastic material usually stagnates against the walls of the distributor channel thereby only the material not in contact with the walls of the distributor channel moves freely and supplies the die orifice. The stagnated material decomposes, flakes into and contaminates the freely flowing plastic material.

Attempts have been made to equalize the pressure distribution along the die orifice entrance by providing the flat-film forming dies with distributor channels which tend to equalize the distance the plastic material travels from the feed-in point of the distributor channel to the various points of the die orifice entrance. For example, large diameter distributor channels, curved or spreading distributor channels, and extremely long, flattened distributor channels have all been tried, but without any appreciable success.

These and other similar devices have not proved to be successful in either eliminating the pressure drop along the die orifice entrance or in eliminating stagnation along the walls of the distributor channel.

The stagnation of plastic material, particularly at the ends of the distributor channel, has also been attacked by mounting, in the distributor channel, a distributing screw having threads which feed the plastic material away from the feed-in point laterally along the distributor channel and also having reverse threads at the ends of the distributor screw which feed the material back toward the feed-in point. Such an arrangement has proved entirely unsatisfactory as it results in the production of flat-film or sheet material of non-uniform thickness. Thus, it has been necessary to use heavy, heated rolls with such an apparatus in order to compact the film or sheet material to the desired thickness after the material has passed from the die orifice. The use of heated, compacting rolls is cumbersome, adds to the time and cost of producing flat-film or sheet material and is generally undesirable.

It is an object of my invention, therefore, to provide apparatus for the production of flat-film or sheet material wherein the disadvantages of prior methods and apparatus are eliminated.

It is a further object of this invention to provide apparatus for the distribution of plastic material to all points of the die orifice of a flat-film or sheet forming apparatus under substantially equal pressure.

Accordingly, my invention provides apparatus for distributing a mass of plastic material from the feed-in point of a distributor channel of flat-film forming apparatus to all points of the distributor channel and into the extrusion die orifice under substantially equal pressures whereby the flat-film produced is characterized by a uniform thickness. In addition, my invention provides apparatus for the production of flat-film material characterized by uniform thickness and being free of any contamination by decomposed plastic material as stagnation of plastic material along the walls of the distributor channel, which eventually leads to the decomposition of the plastic material, is eliminated.

My invention is based on the discovery that by equally distributing plastic material from the feed-in point of the distributor channel of a flat-film forming extrusion apparatus to all points along the distributor channel, the pressure forcing the plastic material along the distributor channel is transmitted uniformly throughout the plastic mass. Substantially equal pressures are developed in forcing the plastic material into and through the extrusion die orifice. Thus, the pressure forcing the plastic material into and through the extrusion die orifice at any point at or in the extrusion die orifice taken on a plane defining a cross sectional area transverse to the direction of flow of the plastic material to the die orifice is substantially the same, and the extruded film or sheet produced is characterized by a uniform thickness. Moreover, by providing and maintaining an equal distribution of material at all points along the distributor channel, stagnation within the distributor channel itself is eliminated.

My invention is also advantageous as it eliminates the need for high pressure flat-film forming extrusion dies having relatively heavy, long land length die lips. Such dies being heavy, are extremely cumbersome and cannot be easily adjusted Dies having heavy, long land length die lips were previously requiresd to build up high back pressures in order to force the plastic materal out along the entire length of the distributor channel. My invention makes possible the utilization of low pressure extrusion dies of relatively light weight having light, thin-walled, short land die lips as development of high back pressures is no longer required. High back pressures are generally undesirable as they cause pulsation and fluttering of die lips thus necessitating the use of heavy die lips to keep the pulsating and fluttering to a minimum. Relatively light, thin-walled, short land die lips are particularly desirable as they can be quickly and easily adjusted in order to make localized thickness corrections in the film or sheet material.

Figure 2:
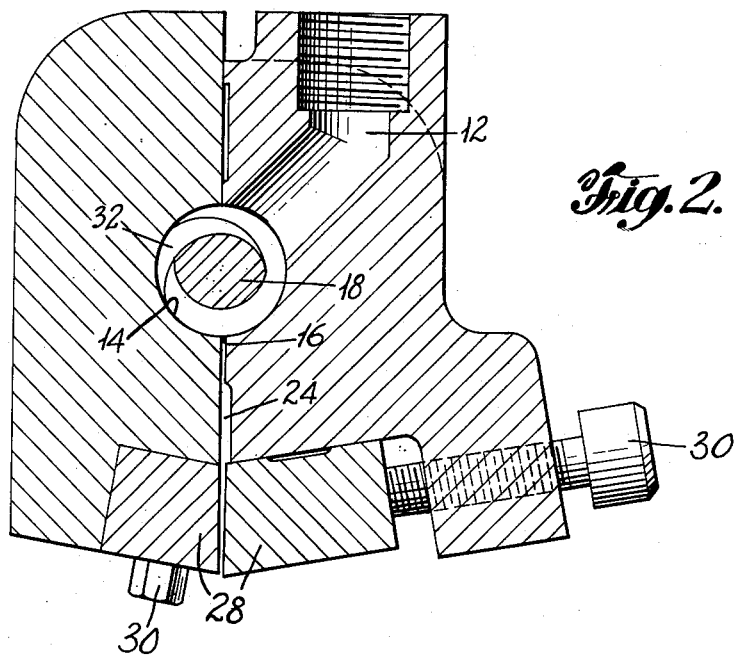

Reference is now made to the accompanying drawing which shows one embodiment of an apparatus which is suitable for carrying out the process phase of this invention wherein like reference numerals designate like parts and wherein FIGURE 1 is an elevational view in partial section showing means mounted in the distributor channel of a flat-film forming extrusion die for providing equal distribution of material throughout the distributor channel and to the entrance of the extrusion die orifice, and FIGURE 2 is a vertical, sectional view taken on the line 2—2 of FIGURE 1.

Specifically referring to FIGURE 1, molten plastic material is fed into distributor channel 14 of extrusion die 10 by way of feed-inlet 12. Distributor channel 14 runs parallel and across the entire width of extrusion die orifice entrance 16, which is shown in FIGURE 2. As the plastic material is fed into distributor channel 14 a conveyor screw 18, rotatably mounted in channel 14 by means of bearings 20 which in turn are locked in place by means of threaded locking nuts 22, mechanically conveys the plastic material along the distributor channel 14 whereby increments of the plastic material are progressively conveyed to all points in the distributor channel 14 and the plastic material is equally distributed throughout all points along the distributor channel 14. Equally distributing plastic material to all points along distributor channel 14 allows the pressure exerted in forcing the plastic material into the distributor channel 14 to be transmitted uniformly throughout the plastic mass. This results in the development of substantially equal pressures along the die orifice entrance 16.

The plastic material enters the extrusion die orifice 24 through the die orifice entrance 16, passes therethrough and is extruded through die lips 28 whose opening can be adjusted by set screws 30. The die lips 28 provide for the development of the back pressure required to extrude the plastic material.

The conveyor screw 18 shown in FIGURE 1 has right and left hand threads 32 which run the entire length of the conveyor screw in order to convey material outwardly from center feed-in point 12 along distributor channel 14 with only one direction of rotation. With an end feed-in point the conveyor screw can have all right or left hand threads depending upon the exact location of the feed-in point. Irrespective of the location of the feed-in-point, the threads on the conveyor screw run the entire length of the screw and convey the plastic material evenly across the entire length of the distributor channel.

Figure 3:
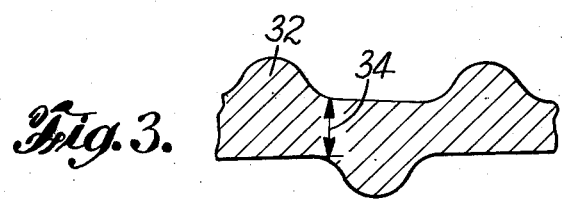

The threads 32 of the conveyor screw 18 are generally rounded as is shown in FIGURE 3. Flat screw threads tend to obstruct the flow of material into the distributor channel upon being brought into register with the feed inlet point by the roatation of the screw. Such an obstruction would produce flow-dead spots which cause an undesirable localized pulsating flow through the die orifice. A pulsating flow of plastic material results in the product of flat-film material of non-uniform thickness.

The screw root 34 as shown in FIGURE 3 is tapered. The actual amount of material which must be handled determines the amount of taper. The pitch or lead of the screw can also be varied to obtain improved control of the distribution of the material.

A variable speed drive can be conveniently used to rotate the conveyor screw 18. If all operating variables such as temperature, viscosity of the plastic material, and through-put rate are fixed, it is possible to use a fixed speed drive. Under normal operating conditions these variables are not fixed so that a variable speed drive is preferred since adjustments in the speed of the conveyor screw can be made to compensate for moderate differences in operating conditions.

It is also to be understood that a choker bar can be used to restrict the flow of material through the extrusion die orifice as is well understood by those skilled in the art. Also the bearings which support the distributor screw in place can have a small clearance to permit a small amount of leakage.

In the process phase of my invention, plastic material is continuously fed, under pressure, and at normal extrusion temperatures through a feed-in point of a flat-film forming extrusion die into the distributor channel, the distributor channel running generally parallel to and across the entrance of the extrusion die orifice. As the material is fed into the distributor channel, it is mechanically conveyed so that the material is equally distributed along all points of the distributor channel. By so conveying the plastic material whereby it is equally distributed along all points of the distributor channel, the pressure forcing the plastic material into the distributor channel is transmitted uniformly throughout the plastic material. Thus the pressure developed along the entrance of the die orifice which forces the plastic material into the die orifice is substantially the same. Therefore, the pressure forcing the plastic material into and through the extrusion die orifice at any point at or in the die orifice taken on a plane defining a cross sectional area transverse to the direction of flow of the plastic material to the die orifice is substantially equal.

The plastic material is forced into and through the extrusion die orifice under conditions which have been previously described. The resultant extruded film or sheet is characterized by a uniform thickness and is free from any decomposed plastic contamination indicating that no stagnation has occurred in the distributor channel.

What is claimed is:

1. In an extresion die having a feed inlet through which plastic material enters, a distributor channel in communication with said feed inlet into which said plastic material enters from said feed inlet and from which said plastic material is discharged, a die orifice in communication with said distributor channel along the entire length thereof, a conveyor screw rotatably mounted in said distributor channel having rounded screw threads of the same pitch running along its entire length from said feed inlet to an extremity of said channel, said conveyor screw being tapered in shape, with the thickness thereof being narrower at said feed inlet, and means for rotating said conveyor screw whereby said plastic material is equally distributed to said die orifice and forced through said die orifice thereby being extruded in the shape of a flat film characterized by uniform thickness.

2. In an extrusion die having a feed inlet intermediate the ends thereof through which plastic material enters, walls forming a distributor channel in communication at its center with said feed inlet, into which plastic material enters from said feed inlet and from which said plastic material is discharged, a die orifice in communication with said distributor channel along the entire length thereof, a conveyor screw, rotatably mounted in said distributor channel, having rounded screw threads of the same pitch positioned along its entire length from said feed inlet to an extremity of said channel, said conveyor screw being tapered in shape with the thickness thereof being narrower at said feed inlet, and means for rotating said conveyor screw whereby said plastic material is equally distributed to said die orifice and forced through said die orifice thereby being extruded in the shape of a flat film characterized by uniform thickness.

3. In an extrusion die having a feed inlet at an end thereof through which plastic material enters, a distributor channel in communication with said feed inlet into which said plastic material enters from said feed inlet and from which said plastic material is discharged, a die orifice in communication with said distributor channel along the entire length thereof, a conveyor screw rotatably mounted in said distributor channel having rounded screw threads of the same pitch running along its entire length from said feed inlet to an extremity of said channel, said conveyor screw being tapered in shape, with the thickness thereof being narrower at said feed inlet, and means for rotating said conveyor screw whereby said plastic material is equally distributed to said die orifice and forced through said die orifice thereby being extruded in the shape of a flat film characterized by uniform thickness.

References Cited in the file of this patent

UNITED STATES PATENTS

| | | |
|---|---|---|
| 2,387,718 | Coleman | Oct. 30, 1945 |
| 2,688,769 | Corbett | Sept. 14, 1954 |
| 2,765,491 | Magerkurth | Oct. 9, 1956 |

FOREIGN PATENTS

| | | |
|---|---|---|
| 518,991 | Canada | Nov. 29, 1955 |
| 1,009,799 | Germany | June 6, 1957 |